US 9,092,217 B2

(12) United States Patent
Zhai et al.

(10) Patent No.: US 9,092,217 B2
(45) Date of Patent: Jul. 28, 2015

(54) POWER MANAGEMENT INTEGRATED CIRCUIT USING A FLEXIBLE SCRIPT-BASED CONFIGURATOR AND METHOD FOR POWER MANAGEMENT

(75) Inventors: Shubing Zhai, Shanghai (CN); Hanbing Jiang, ZheJiang (CN); Fei Ma, Shanghai (CN)

(73) Assignee: Integrated Device Technology, inc., San Jose, CA (US)

( * ) Notice: Subject to any disclaimer, the term of this patent is extended or adjusted under 35 U.S.C. 154(b) by 47 days.

(21) Appl. No.: 13/127,211

(22) PCT Filed: Apr. 6, 2011

(86) PCT No.: PCT/CN2011/000580
§ 371 (c)(1),
(2), (4) Date: Sep. 26, 2011

(87) PCT Pub. No.: WO2012/135973
PCT Pub. Date: Oct. 11, 2012

(65) Prior Publication Data
US 2012/0260109 A1 Oct. 11, 2012

(51) Int. Cl.
*G06F 1/00* (2006.01)
*G06F 1/26* (2006.01)
*G06F 1/32* (2006.01)

(52) U.S. Cl.
CPC .................................. *G06F 1/3203* (2013.01)

(58) Field of Classification Search
CPC .................................................... G06F 1/3203
USPC ................................................. 713/300, 324
See application file for complete search history.

(56) References Cited

U.S. PATENT DOCUMENTS 7,782,029 B2 * 8/2010 Chapuis et al. ............... 323/267
2008/0182608 A1 * 7/2008 Rofougaran .................. 455/522

(Continued)

FOREIGN PATENT DOCUMENTS

| CN | 1917546 A | 2/2007 |
| CN | 101227675 A | 7/2008 |
| CN | 101686011 A | 3/2010 |

OTHER PUBLICATIONS

ISR and Written Opinion for related PCT Application No. PCT/CN2011/000580, dated Dec. 8, 2011.

*Primary Examiner* — Thomas Lee
*Assistant Examiner* — Robert Cassity
(74) *Attorney, Agent, or Firm* — Hayes and Boone LLP (57) ABSTRACT

A power management integrated circuit incorporates (a) a microprocessor; (b) a non-volatile memory accessible by the microprocessor for storing programs executable by the microprocessor; (c) a random access memory accessible by the microprocessor; (d) an external interface which allows an external device to communicate with the power management integrated circuit; and (e) power regulators providing regulated output voltages from the power management integrated circuit, each power regulator being controllable by the microprocessor and the external interface over the register-controlled bus. A second external interface may be provided, which is used to provide a configuration file descriptive of power requirements of a system in which the power management integrated circuit is deployed. Such a system may include a system-on-a-chip (SOC) integrated circuit. Initially, the microprocessor of the power management integrated circuit executes a power sequence to provide the power-up power supply voltages to the SOC integrated circuit. Thereafter, the SOC integrated circuit controls power-up sequences for the peripheral devices. The configuration file is derived from a script file that is editable by a text editor or a word processor. The script file may be based on a scripting language that allows specifying control of the power regulators of the power management integrated circuit.

21 Claims, 3 Drawing Sheets

(56) References Cited

U.S. PATENT DOCUMENTS

| | | | |
|---|---|---|---|
| 2008/0307240 A1* | 12/2008 | Dahan et al. | 713/320 |
| 2009/0177899 A1* | 7/2009 | Chen et al. | 713/300 |
| 2010/0013306 A1* | 1/2010 | Heineman et al. | 307/32 |
| 2010/0250974 A1* | 9/2010 | Ristic et al. | 713/300 |
| 2011/0022826 A1* | 1/2011 | More et al. | 713/1 |
| 2011/0154085 A1* | 6/2011 | Rickard | 713/340 |
| 2012/0047382 A1* | 2/2012 | Barnes et al. | 713/324 |

* cited by examiner

```
#define CONST1 0x00
#define CONST2 0x01
.
.                          301
.

//Sequence1 Definition
BEGIN
WAITV(...)
.
.
.                          302
END

//Sequence2 Definition
BEGIN
WAITV(...)
.
.
.
END                        303
.
.
```
300

POWER MANAGEMENT INTEGRATED CIRCUIT USING A FLEXIBLE SCRIPT-BASED CONFIGURATOR AND METHOD FOR POWER MANAGEMENT

BACKGROUND OF THE INVENTION

1. Field of the Invention

The present invention relates to integrated circuit power management. In particular, the present invention relates to a flexible power management circuit that, based on executing a script file, controls and sequences the various power supply circuits in a system.

2. Discussion of the Related Art

A typical electronic system includes many components which require different power supply voltages for proper operations. Some common required voltages are 5.0V, 3.3V, 2.5V, 1.8V, 1.2V and 1V. For example, a system-on-a-chip (SOC) integrated circuit (IC) may require a low voltage for a digital core, a higher voltage for input/output (I/O) operations, another voltage for analog circuitry (e.g., phase-locked loops (PLL), analog-digital-converter (ADC), yet another voltage for one or more memory interfaces, and an always-on voltage to keep system state during a power-saving or sleep mode. In addition, a typical system also includes, in addition to the SOC, additional peripheral devices or controllers each having specific power requirements. To bring up such a system, proper sequencing of the various power supplies is required.

One possible solution is to incorporate into the SOC a software programmable capability to manage the system's power supply requirements. However, the SOC itself is typically a complicated integrated circuit requiring multiple power supply voltages, with specific sequencing requirements. Therefore, one solution in the prior art is to provide a simple processor (i.e., one requiring only a single power supply) to first bring up the SOC, which then allows the SOC bring up the peripheral devices or controllers. A reverse sequence takes place when the system is shut down.

Figure 1:
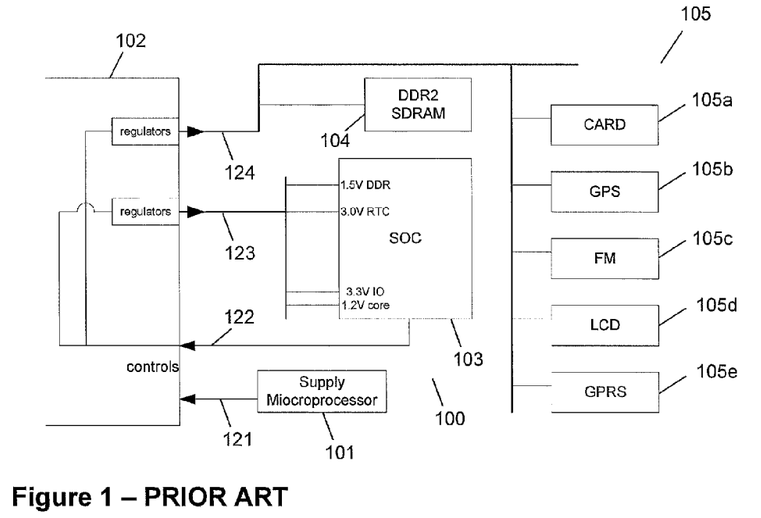
FIG. 1 shows system 100 having a power management system of the prior art.

FIG. 1 shows an exemplary system 100 of such a solution. As shown in FIG. 1, system 100 includes single-supply microprocessor 101, power management IC 102, SOC 103, memory devices 104, and a number of memory-mapped peripherals 105 (e.g., removable memory card reader 105a, global positioning system (GPS) device 105b, FM radio receiver 105c, liquid crystal display (LCD) 105d and GPRS radio communication system 105e). Power management IC generates the various regulated power supply voltages required by system 100. In system 100, after single-supply microprocessor 101 boots up, single-power supply microprocessor 101 interacts with (indicated by arrow 121) power management IC 102 to provide the power-up sequence 123 of SOC 103. In some instances, single-supply microprocessor 101 may download power management information regarding memory devices 104 and peripheral devices and controllers 105 into SOC 103. In other instances, SOC 103 may discover memory devices and peripheral device and controllers 105, may use its own pre-programmed power management information. Thereafter, SOC 103 interacts with (indicated by arrow 122) power management IC 102 to provide the power-up sequences 124 for memory devices 104 and memory-mapped peripherals 105.

A system, such as system 100, has a number of disadvantages. First, a system designer typically develops a family of related systems that are made up of different combinations of SOCs, memory and other peripheral devices, each having different specific power sequencing requirements. Thus, even though the systems are related, a different set of power-up and power-down sequences need to be developed for each system. Development of a set of power-up and power-down sequences typically takes place using an in-circuit emulation (ICE) system. The designer usually writes code for single-supply microprocessor 101 using a high-level programming language (e.g., the "C" programming language), which is compiled into executable code. In such a system, system development and system changes require the specialized skills of a software engineer, using debugging tools provided on the ICE system. Experience has demonstrated that in the life of a product, many minor changes are often needed. For example, a minor change on the printed circuit board (PCB) may require adding an additional millisecond delay in a power-up sequence for a regulated power supply. Even such a simple change requires the software engineer to modify and recompile the software on the ICE system. However, in many applications, power management problems are diagnosed in the field by field application engineers who often have neither access to such an ICE system nor the requisite skills to perform the sophisticated software tasks.

SUMMARY

According to some embodiments of the present invention, a power management integrated circuit is provided which incorporates (a) a microprocessor; (b) a non-volatile memory accessible by the microprocessor for storing programs executable by the microprocessor; (c) a random access memory accessible by the microprocessor; (d) an external interface which allows an external device to communicate with the power management integrated circuit; and (e) power regulators providing regulated output voltages from the power management integrated circuit, each power regulator being controllable by the microprocessor and the external interface over the register-controlled bus. The external interface may be, for an example, a serial interface (e.g., an I2C interface). In some embodiments, a second external interface is provided, which is used to provide a configuration file descriptive of power requirements of a system in which the power management integrated circuit is deployed.

According to some embodiments of the present invention, the power management integrated circuit may be deployed in a system including a system-on-a-chip (SOC) integrated circuit. Initially, the microprocessor of the power management integrated circuit executes a power sequence to provide the power-up power supply voltages to the SOC integrated circuit. Thereafter, the SOC integrated circuit controls power-up sequences for the peripheral devices.

In some embodiments, the configuration file is derived from a script file that is editable by a text editor or a word processor. The script file is based on a scripting language that allows specifying control of the power regulators of the power management integrated circuit. Such a scripting language may include commands that allow specifying a power-up condition for each of the power regulators. The power-up condition may include one or more of checking the value of the register representing a power regulator, checking the value of a bit of the register representing the power regulator, waiting a specified time period, waiting for a bit of the register representing the power regulator to be set or cleared, and waiting for an interrupt external or internal to the power management integrated circuit.

According to some embodiments of the present invention, a method is provided based on the operations of the power management integrated circuit.

The present invention is better understood upon consideration of the detailed description below in conjunction with the accompanying drawings.

BRIEF DESCRIPTION OF THE DRAWINGS

To simplify the description and to facilitate identification of common information among the figures, like elements are assigned like reference numerals.

DETAILED DESCRIPTION OF THE PREFERRED EMBODIMENTS

Figure 2:
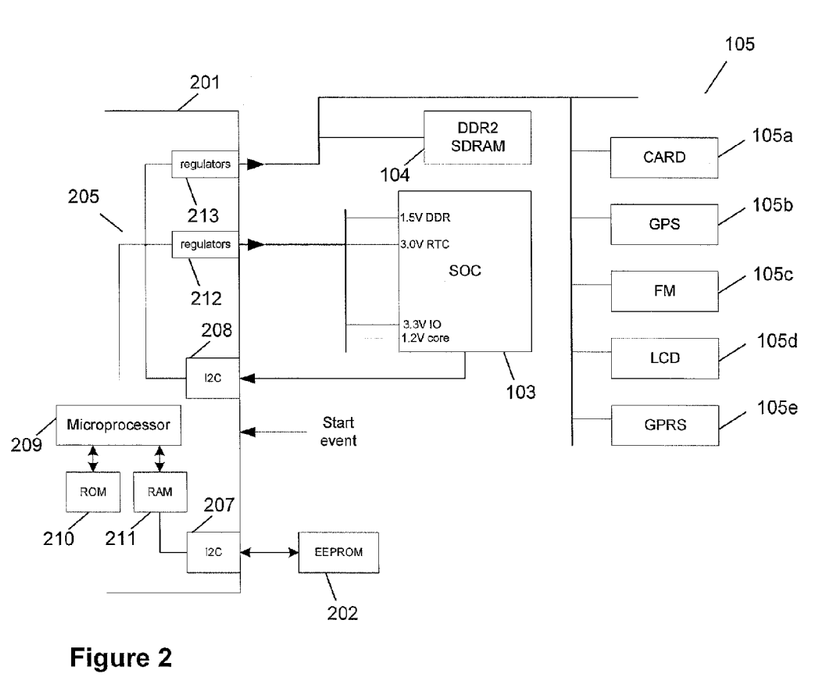
FIG. 2 shows exemplary system 200 according to some embodiments of the present invention.

The present invention integrates a power-management microprocessor and various power regulators into a single power management device. In addition, the present invention provides utility software that interprets a script written in a scripting language (described below) to synthesize a configuration file that can be used by the power-management device to provide power-up sequences for devices in any system in which the power management device is deployed. The scripting language is designed to be readily learned by even a field application engineer without the specialized skills of a software engineer. A script written in such a scripting language may be read and edited by a user using any suitable text editor or word processor. FIG. 2 shows exemplary system 200 according to some embodiments of the present invention.

As shown in FIG. 2, system 200 includes power management IC 201 which incorporates microprocessor 209 with power regulators 212 and 213, according to some embodiments of the present invention. Power regulators 212 and 213 are controlled from a register-controlled bus 205, which may be accessed by both microprocessor 209 and SOC 103. Under this arrangement, each power regulator is assigned a register address. Using this arrangement, the values of the power regulator's control parameters are set or read by the bits or values written into the "register." In exemplary system 200, SOC 103 accesses the register-controlled bus 205 over an industrial standard serial interface (e.g., I2C slave interface 208).

In FIG. 2, microprocessor 209 is supported with internal read-only memory (ROM) 210 and random-access memory (RAM) 211, and an external industrial standard serial interface (e.g., I2C master interface 207), all of which are integrated into power management IC 201. Initially, at power-up, microprocessor 209 is booted up from internal ROM 210. Thereafter, microprocessor 209 loads a configuration file into internal RAM 211 from an external non-volatile memory device (e.g., electrically erasable and programmable read-only memory (EEPROM) 202) over the I2C master interface 207. The configuration file is prepared by the utility tool of the present invention from a script written in the scripting language of the present invention. In some embodiments, where power management IC 201 is designed for a volume-production platform, the configuration file is also incorporated into internal ROM 210, thereby eliminating the need and cost for an external non-volatile memory. System 200 may support microprocessor 209 to control the power-up sequences for SOC 103, memory devices 104 and peripheral devices and controllers 105. Alternatively, microprocessor 209 may first control the power-up sequence for SOC 103, and allows SOC 103 to control the power-up sequences for memory devices 104 and peripheral devices and controllers 105 in turn, or any of many variations of such an arrangement.

According to some embodiments of the present invention, the configurable file is an image file that may be included into internal ROM 210. In addition, vendors of devices or other suppliers may also provide script files for controlling power-up sequences for their specific devices which may be merged with other script files for other devices in the system to provide all the power-up sequences necessary for the system. Script files for power-down or other power events may be similarly provided. The utility tool operates on the merged script files to provide the image file that includes all power-up, power-down or other power event sequences to be controlled by microprocessor 209 of power management device 201.

According to some embodiments of the present invention, a scripting language of the present invention includes, for example, the following instructions or commands ("statements"):

a) "Write"—writes a value into a register
   a. Usage: Write(register_address, value), where register_ address is a 16-bit address specifying a register and value is an 8-bit value;
   b. Example—Write(0x0100, 0xaa)
b) "Wait"—remains in wait a state for a specified time period
   a. Usage: Wait (microsecond), where microsecond is a 16-bit value;
   b. Example: Wait(1000);
c) "WaitF"—checks whether a bit in a register is set or cleared, and accordingly executes the next instruction or exits the current sequence;
   a. Usage: WaitF(address, bit, value), where address is a 16-bit address specifying a register, bit is a 0-7 value specifying one of 8 bit positions, and value is 0 or 1 (i.e., cleared or set);
   b. Example: WaitF(0x0100, 3, 1)
d) "WaitV"—checks whether a register has the specified value, and accordingly executes the next instruction or exits the current sequence;
   a. Usage: WaitV(address, value), where address is a 16-bit address specifying a register, and value is an 8-bit value;
   b. Example: WaitV(0x0100, 0xff)
e) "SetF"—sets or clears a specified bit in a specified register;
   a. Usage: SetF(address, bit, value), where address is a 16-bit address specifying a register, bit is a 0-7 value specifying one of 8 bit positions, and value is 0 or 1 (i.e., cleared or set);
   b. Example: SetF(0x0100, 3, 1)
f) "LoopF"—waits on a bit to be set or clear in a specified register, the firm idles until the specified condition is satisfied;
   a. Usage: LoopF(address, bit, value), where address is a 16-bit address specifying a register, bit is a 0-7 value specifying one of 8 bit positions, and value is 0 or 1 (i.e., cleared or set);
   b. Example: LoopF(0x0100, 3, 1)

g) "#define"—a construct to define a mnemonic for a constant;
   a. Usage: #define VAR value, where VAR can be any string of alphanumeric characters (including '_'), and value can be any 8- or 16-bit value, as appropriate;
   b. Example: #define REG_BUCK0 0xa080

As indicated, values may be expressed, for example, in hexadecimal notations. In some embodiments, reserved keywords "Begin" and "End" may be used to delimit beginning and end of a specified sequence. A reserve keyword "//" is used to signal the beginning of a comment line (i.e., a text string which serves no functional purpose other than for the human readership).

Figure 3:
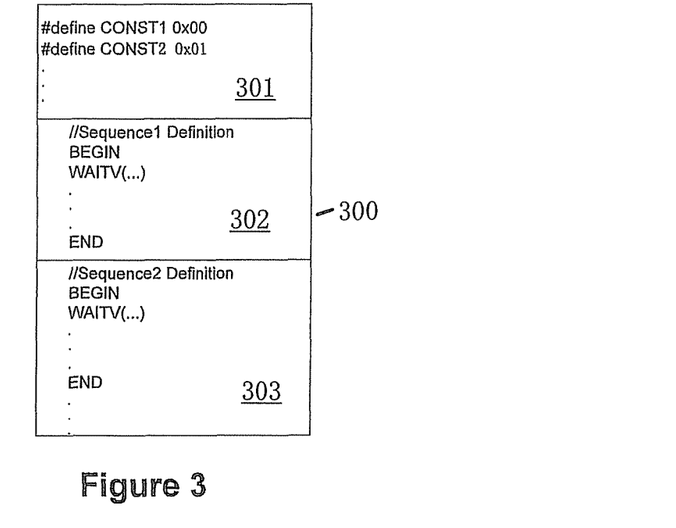
FIG. 3 illustrates a representative format of script 300 written in the scripting language of the present invention.

FIG. 3 illustrates a representative format of script 300 written in the scripting language of the present invention. As shown in FIG. 3, script 300 includes sections 301, 302 and 303. Section 301 includes mnemonic definitions of constants, and sections 302 and 303 are sequences each delimited by "Begin" and "End" reserved keywords. As shown in FIG. 3, it is expected that, at the entry point of each sequence, a WaitV, WaitF, or LoopF statement is used to wait on a condition, or to determine if a condition is satisfied, for the sequence to proceed.

Figure 4:
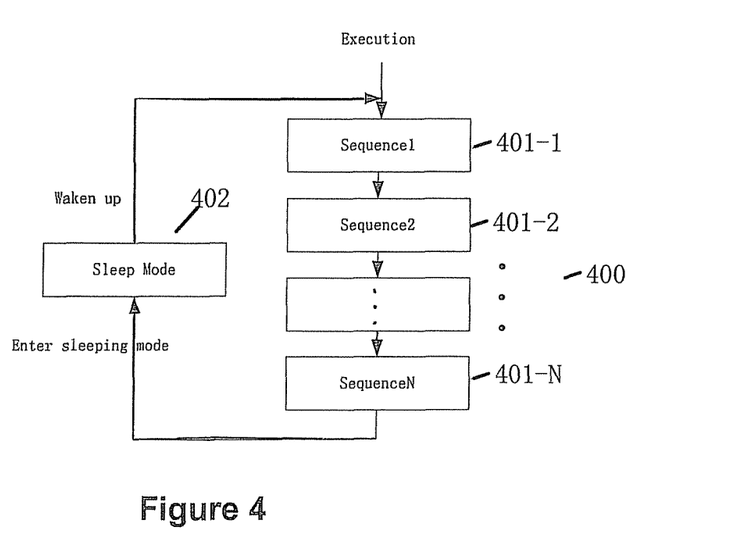
FIG. 4 is flow chart 400 showing the operations of a representative script, according to some embodiments of the present invention.

FIG. 4 is flow chart 400 showing the operations of a representative script, according to some embodiments of the present invention. As shown in FIG. 4, the representative script includes N sequences, labeled respectively 401-1, 401-2, . . . , 401-N. Initially (i.e., at power-up), according to whether or not a condition specified by a WaitV, WaitF or LoopF statement is satisfied, the statements in sequence 401-1 is first executed, or sequence 401-1 exited. After that, each of sequence 401-2, . . . , 401-N are likewise examined in turn for execution or is exited. The process is then in sleep mode (i.e., state 402). By executing all sequences 401-1, 401-2, . . . , 401-N, the system transitions from power-up or sleep mode 402 to fully power active, and from fully power active to power-down sequences to sleep mode 402. At sleep mode 402, an internal or external interrupt to microprocessor 209 restarts at sequence 401-1.

Figure 5:
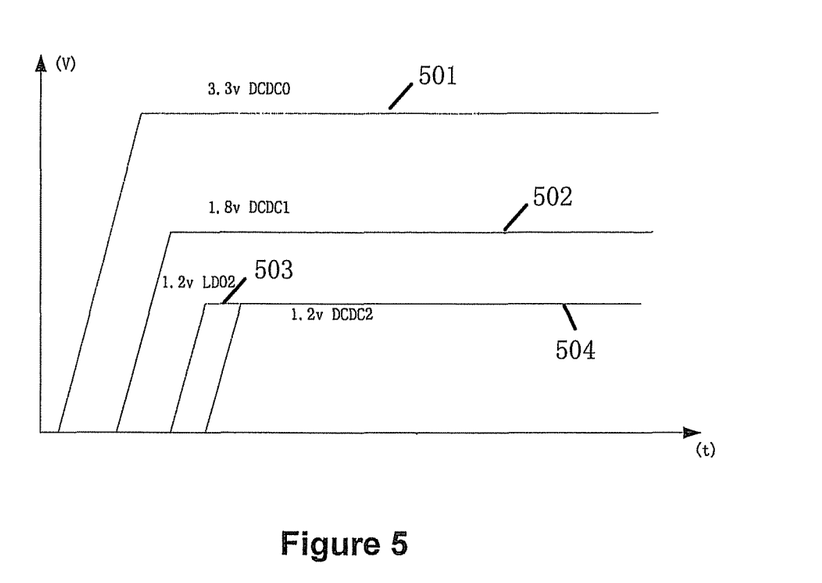
FIG. 5 shows power curves 501, 502, 503 and 504, respectively, illustrating the required power-up sequences for four regulated power supply regulators, according to some embodiments of the present invention.

The following exemplary script manages four regulated power supply regulators requiring the power-up sequences illustrating by power curves 501, 502, 503 and 504 of FIG. 5, respectively. Power curve 501 represents a 3.3 volts DC/DC buck converter, which is enabled after a power button is pressed. Power curve 502 represents a 1.8 volts DC/DC buck converter, which enters regulation after the 3.3 volts DC/DC buck converter is in regulation. Likewise, power curve 503 represents a 1.2 volts low drop-out (LDO) converter which enters regulation after the 1.8 volts buck converter enters regulation. Power curve 504 represents a 1.2 volts DC/DC buck converter which is turned on or off by an interrupt signal received on an external general purpose I/O (GPIO) pin.

In the following script, section 1 defines the mnemonic constants for registers, voltages, and bits. Section 2.1 provides the power-up sequence of the PLLs, the 3.3 volts DC/DC buck converter, the 1.8 volts DC/DC buck converter, and the 1.2 volts LDO converter. Section 2.2 provides the power-up sequence for the 1.2 volts DC/DC buck converter, based on waiting on an interrupt at external GPIO pin GPIO7. Section 2.3 provides the power-down sequence for the 1.2 volts DC/DC buck converter, based on waiting on an interrupt at external GPIO pin GPIO7. Section 2.4 is a general power-down sequence, also based on waiting on an external interrupt. Section 2.5 is a general power-down sequence, also based on waiting on an external interrupt (in this case, the power button is held down for a specific period of time).

Exemplary Script File

```
//*************************************************
//          Example power Sequence
//*************************************************
// LDO      1.2V - LDO_150_1
//
// DC/DC    3.3V - Buck0
//          1.8V - Buck1
//          1.2V - Buck2 (Controlled by GPIO7)
//*************************************************
//*************************************************
// 1. Registers Definition
//*************************************************
//Define constants
//register definition
//ACCM Registers
#define REG_SYSTEM_RESET          0XA000
#define REG_GLOBAL_LDO_ENABLE     0XA004
#define REG_GLOBAL_DCDC_ENABLE    0XA005
#define REG_INT_STATUS0           0XA00A
#define REG_INT_STATUS1           0XA00B
#define REG_EXT_INT_STATUS        0XA015
// REG_UP_CONTEXT0 is used as power state register
#define REG_UP_CONTEXT0           0XA018
#define PWR_STATE_0               0X00
#define PWR_STATE_1               0X01
//=================================================
// PCON Registers
#define REG_GPIO_DATA0            0XA022
#define REG_GPIO_INT_STATUS0      0XA02A
#define REG_SWITCH_STATUS         0XA031
#define REG_PLL_CONFIG            0XA034
#define REG_POR_OUT               0XA03C
// LDO/DCDC Registers
#define REG_LDO150_1              0xA062
#define REG_BUCK0                 0XA080
#define REG_BUCK1                 0XA082
```

-continued

```
#define REG_BUCK2                    0XA084
//voltage definition
//DCDC Output voltage = VOUT*25 + 750 mV
#define BUCK_33V                     0X66
#define BUCK_18V                     0X2A
#define BUCK_12V                     0X12
//LDO Output voltage = VOUT*25 + 750 mV
#define LDO_12V                      0X12
//bit definition
#define BIT_EXT_INT                  0X00
#define BIT_GLOBAL_BUCK0             0X00
#define BIT_GLOBAL_BUCK1             0X01
#define BIT_GLOBAL_BUCK2             0X02
#define BIT_GLOBAL_LDO150_1          0X05
#define BIT_RESET                    0X07
#define BIT_INT_STATUS_GPIO7         0X07
#define BIT_INT_STATUS_SSW           0X04
#define BIT_INT_STATUS_LSW           0X05
#define BIT_GPIO7                    0X07
#define BIT_S0                       0X00
#define BIT_S1                       0X01
#define BIT_LDO_ENABLE               0X07
#define BIT_BUCK_ENABLE              0X07
//****************************************************
// 2. Sequence Definition
//****************************************************
//====================================================
// 2.1 Power on sequence
//     Active when: cold start (power state == 0x00) and short //button push is detected
BEGIN
//check power state == 0x00, the up-context0 register has the
//value of /0 on cold start
WAITV(REG_UP_CONTEXT0, PWR_STATE_0)
//check ssw interrupt happened. Short button press will cause
//an interrupt
WAITF(REG_INT_STATUS1, BIT_INT_STATUS_SSW, 1)
//assert the output power on reset
WRITE(REG_POR_OUT, 0X00)
//PLL power up with 32Khz XTAL_IN as reference clock
SETF(REG_PLL_CONFIG, BIT_S1, 1)
SETF(REG_PLL_CONFIG, BIT_S0, 0)
//wait 3ms for pll lock
WAIT(3000)
//set the output voltage of BUCK&LDO
WRITE(REG_BUCK0, BUCK_33V)
WRITE(REG_BUCK1, BUCK_18V)
WRITE(REG_BUCK2, BUCK_12V)
WRITE(REG_LDO150_1, LDO_12V)
//enable global BUCK&LDO output
SETF(REG_GLOBAL_DCDC_ENABLE, BIT_GLOBAL_BUCK0, 1)
SETF(REG_GLOBAL_DCDC_ENABLE, BIT_GLOBAL_BUCK1, 1)
SETF(REG_GLOBAL_DCDC_ENABLE, BIT_GLOBAL_BUCK2, 1)
SETF(REG_GLOBAL_LDO_ENABLE, BIT_GLOBAL_LDO150_1, 1)
//(1) enable Buck0-3.3V first
SETF(REG_BUCK0, BIT_BUCK_ENABLE, 1)
//(2) enable Buck1-1.8V after 330us
WAIT(240)
SETF(REG_BUCK1, BIT_BUCK_ENABLE, 1)
//(3) enable LDO_150_1-1.2V after 180us
WAIT(30)
SETF(REG_LD0150_1, BIT_LDO_ENABLE, 1)
//(4) release the output power on reset after 1ms
WAIT(1000)
WRITE(REG_POR_OUT, 0X01)
//clear ssw interrupt status bit
WRITE(REG_SWITCH_STATUS, 0X01)
//set power state to 0x01. you need to maintain your own power //state
WRITE(REG_UP_CONTEXT0,PWR_STATE_1)
END
//====================================================
// 2.2 Buck2-1.2V turn on sequence
//     Active when: GPIO7 interrupt detected and GPIO7 is high
BEGIN
//check GPIO7 interrupt happened
WAITF(REG_INT_STATUS0, BIT_INT_STATUS_GPIO7, 1)
//check GPIO7 is high
```

-continued

```
WAITF(REG_GPIO_DATA0, BIT_GPIO7, 1)
//enable buck2
SETF(REG_BUCK2, BIT_BUCK_ENABLE, 1)
//clear GPIO7 interrupt status bit
WRITE(REG_GPIO_INT_STATUS0, 0X80)
END
//==================================================
// 2.3 Buck2-1.2V turn off sequence
//    Active when: GPIO7 interrupt detected and GPIO7 is low
BEGIN
//check GPIO7 interrupt happened
WAITF(REG_INT_STATUS0, BIT_INT_STATUS_GPIO7, 1)
//check GPIO7 is low
WAITF(REG_GPIO_DATA0, BIT_GPIO7, 0)
//disable buck2
SETF(REG_BUCK2, BIT_BUCK_ENABLE, 0)
//clear GPIO7 interrupt status bit
WRITE(REG_GPIO_INT_STATUS0, 0X80)
END
//==================================================
// 2.4 Power off sequence 1
//    Active when: power state == 0x01 and external
interrupt //detected
BEGIN
//check power state == 0x01
WAITV(REG_UP_CONTEXT0, PWR_STATE_1)
//external AP write the "external INT data" register
WAITF(REG_EXT_INT_STATUS,BIT_EXT_INT,1)
//(1) disable Buck0-3.3V first
SETF(REG_BUCK0, BIT_BUCK_ENABLE, 0)
WAIT(250)
//(2) disable all other power together after 330us
WRITE(REG_GLOBAL_DCDC_ENABLE, 0x00)
WRITE(REG_GLOBAL_LDO_ENABLE, 0x00)
SETF(REG_BUCK1, BIT_BUCK_ENABLE, 0)
SETF(REG_BUCK2, BIT_BUCK_ENABLE, 0)
SETF(REG_LDO150_1, BIT_LDO_ENABLE, 0)
//wait 1 ms
WAIT(1000)
//clear external interrupt status bit
WRITE(REG_EXT_INT_STATUS, 0x01)
//set system_reset to make cyrus chip into off state
SETF(REG_SYSTEM_RESET,BIT_RESET,1)
END
//==================================================
// 2.5 Power off sequence 2
//    Active when: power state == 0x01 and long button push
is detected
BEGIN
//check power state == 0x01
WAITV(REG_UP_CONTEXT0, PWR_STATE_1)
//check lsw interrupt happened
WAITF(REG_INT_STATUS1, BIT_INT_STATUS_LSW, 1)
//(1) disable Buck0-3.3V first
SETF(REG_BUCK0, BIT_BUCK_ENABLE, 0)
WAIT(250)
//(2) disable all other power together after 330us
WRITE(REG_GLOBAL_DCDC_ENABLE, 0x00)
WRITE(REG_GLOBAL_LDO_ENABLE, 0x00)
SETF(REG_BUCK1, BIT_BUCK_ENABLE, 0)
SETF(REG_BUCK2, BIT_BUCK_ENABLE, 0)
SETF(REG_LDO150_1, BIT_LDO_ENABLE, 0)
//wait 1 ms
WAIT(1000)
//clear lsw interrupt status bit
WRITE(REG_SWITCH_STATUS, 0X02)
//set system_reset to make cyrus chip into off state
SETF(REG_SYSTEM_RESET,BIT_RESET,1)
END
```

Therefore, according to the present invention, the simple register interface and the relative ease of the scripting language allows the system designer to focus on system issues without being required of high-level language programming skills and the accesses to a compiler and an ICE system, since a script file may be edited easily using any text editor or word processor, such that changes in a system may be written and implemented very quickly. The utility program, which includes an interpreter for the scripting language, may be installed on any desktop or mobile computer. In addition, the prior art's external single-supply microprocessor is eliminated.

The detailed description above is provided to illustrate specific embodiments of the present invention and is not intended to be limiting. Numerous variations and modifications within the scope of the present invention are possible. In fact, the scripting language of the present invention can be used to manage not only power sequences, but also can be used for handling any events through a set of registers. The present invention is set forth in the accompanying claims.

The invention claimed is:

1. A power management integrated circuit, comprising:
a microprocessor;
a non-volatile memory accessible by the microprocessor for storing programs executable by the microprocessor;
a random access memory accessible by the microprocessor; and
a plurality of power regulators providing a plurality of regulated output voltages from the power management integrated circuit, each power regulator being coupled to a register-controlled bus and thereby to the microprocessor and at least one power regulator providing a regulated output voltage to an external device, and wherein an external interface allows the external device to directly communicate through the register-controlled bus to the plurality of power regulators such that each power regulator is controllable by the microprocessor and the external device over the register-controlled bus,
wherein the microprocessor accesses a scripted configuration file descriptive of power requirements of a system in which the power management integrated circuit is deployed,
wherein each of the plurality of power regulators is provided a register address and the microprocessor and the external device control register contents sent to the register address through the register-controlled bus; and
wherein the microprocessor controls the plurality of power regulators during a power-up sequence of the external device, and the external device controls the plurality of power regulators after the power-up sequence.

2. The power management integrated circuit of claim 1, wherein the external interface comprises a serial interface.

3. The power management integrated circuit of claim 2, wherein the serial interface comprises an I2C interface.

4. The power management integrated circuit of claim 1, further comprising a second external interface for providing the scripted configuration file.

5. The power management integrated circuit of claim 4, wherein the system comprises a system-on-a-chip (SOC) integrated circuit.

6. The power management integrated circuit of claim 5, wherein a power sequence executed by the microprocessor provides the power-up power supply voltages to the SOC integrated circuit.

7. The power management integrated circuit of claim 6, wherein the system further comprises peripheral devices, and wherein the SOC integrated circuit controls power-up sequences for the peripheral devices.

8. The power management integrated circuit of claim 4, wherein the scripted configuration file is based on a scripting language that allows specifying control of the power regulators of the power management integrated circuit.

9. The power management integrated circuit of claim 8, wherein the scripting language comprises commands that allow specifying a power-up condition for each of the power regulators.

10. The power management integrated circuit of claim 9, wherein the power-up condition comprises one or more of checking the value of the register representing a power regulator, checking the value of a bit of the register representing the power regulator, waiting a specified time period, waiting for a bit of the register representing the power regulator to be set or cleared, and waiting for an interrupt external or internal to the power management integrated circuit.

11. A method comprising:
(a) providing in a power management integrated circuit:
a microprocessor;
a non-volatile memory accessible by the microprocessor for storing programs executable by the microprocessor;
a random access memory accessible by the microprocessor; and
a plurality of power regulators providing a plurality of regulated output voltages from the power management integrated circuit, each power regulator coupled to a register-controlled bus, at least one power regulator providing a regulated output voltage to an external device, wherein each of the plurality of power regulators is provided a register address and the microprocessor executes scripts to control register contents sent to the register address through the register controlled bus;
an external interface that allows the external device to directly communicate with each power regulator through the register-controlled bus; and
(b) controlling each power regulator by the microprocessor and the external device over the register-controlled bus, wherein the microprocessor controls each power regulator during a power-up sequence of the external device, and the external device controls each power regulator after the power-up sequence.

12. The method of claim 11, wherein the external interface comprises a serial interface.

13. The method of claim 12, wherein the serial interface comprises an I2C interface.

14. The method of claim 11, further comprising:
providing a second external interface in the power management integrated circuit; and
loading a configuration file into the random access memory, the configuration file being descriptive of power requirements in a system in which the power management integrated circuit is deployed.

15. The method of claim 14, wherein the system comprises a system-on-a-chip (SOC) integrated circuit.

16. The method of claim 15, further comprising executing a power sequence in the microprocessor to provide the power-up power supply voltages to the SOC integrated circuit.

17. The method of claim 16, wherein the system further comprises peripheral devices, the method further comprising controlling power-up sequences for the peripheral devices through the SOC integrated circuit.

18. The method of claim 14, wherein the configuration file is derived from a script file that is editable by a text editor or a word processor.

19. The method of claim 18, wherein the script file is based on a scripting language that allows specifying control of the power regulators of the power management integrated circuit.

20. The method of claim 19, further comprising providing in the scripting language commands that allow specifying a power-up condition for each of the power regulators.

21. The method of claim 20, wherein the power-up condition comprises one or more of checking the value of the register representing a power regulator, checking the value of a bit of the register representing the power regulator, waiting a specified time period, waiting for a bit of the register representing the power regulator to be set or cleared, and waiting for an interrupt external or internal to the power management integrated circuit.

* * * * *